US012766458B2

(12) United States Patent
Watanabe et al.

(10) Patent No.: US 12,766,458 B2
(45) Date of Patent: Oct. 20, 2026

(54) RECYCLING METHOD FOR DIRECT AIR CAPTURE DEVICE

(71) Applicant: TOYOTA JIDOSHA KABUSHIKI KAISHA, Toyota (JP)

(72) Inventors: Masaki Watanabe, Sunto-gun (JP); Satsuki Osada, Mishima (JP); Mitsuru Sakano, Gotemba (JP)

(73) Assignee: TOYOTA JIDOSHA KABUSHI KAISHA, Toyota (JP)

( * ) Notice: Subject to any disclaimer, the term of this patent is extended or adjusted under 35 U.S.C. 154(b) by 308 days.

(21) Appl. No.: 18/606,568

(22) Filed: Mar. 15, 2024

(65) Prior Publication Data

US 2024/0350964 A1 Oct. 24, 2024

(30) Foreign Application Priority Data

Apr. 19, 2023 (JP) ................................ 2023-068431

(51) Int. Cl.
*B01D 53/14* (2006.01)

(52) U.S. Cl.
CPC ..... *B01D 53/1431* (2013.01); *B01D 53/1418* (2013.01); *B01D 53/1475* (2013.01); *B01D 2252/10* (2013.01); *B01D 2252/204* (2013.01); *B01D 2252/205* (2013.01); *B01D 2257/504* (2013.01); *B01D 2259/40088* (2013.01)

(58) Field of Classification Search
CPC ............... B01D 53/02; B01D 53/1418; B01D 53/1425; B01D 53/1431; B01D 53/1475; B01D 53/1493; B01D 53/62; B01D 53/04; B01D 52/047; B01J 20/103; B01J 20/10; B01J 20/28; B01J 20/32; B01J 20/34; B01J 20/28; B01J 20/26; B01J 20/30
See application file for complete search history.

(56) References Cited

U.S. PATENT DOCUMENTS 5,256,386 A * 10/1993 Nystrom ................ C01B 33/16 502/8

FOREIGN PATENT DOCUMENTS

| | | |
|---|---|---|
| JP | 2012-055886 A | 3/2012 |
| JP | 2021-062374 A | 4/2021 |
| WO | WO 2008/021700 A1 | 2/2008 |
| WO | WO 2012/168346 A1 | 12/2012 |

(Continued)

OTHER PUBLICATIONS

Sanz-Peréz et al. "Reuse and Recycling of Amine-Functionalized Silica Materials for CO2 Adsorption" Chemical Engineering Journal 308 (2017) 1021-1023 (Year: 2017).*

(Continued)

*Primary Examiner* — Sharon Pregler
(74) *Attorney, Agent, or Firm* — Finnegan, Henderson, Farabow, Garrett and Dunner, LLP

(57) ABSTRACT

A recycling method for a direct air capture device is a recycling method for a direct air capture device including a porous carrier on which a carbon dioxide absorbent is supported. The porous carrier is made of an inorganic material having a hydroxyl group. The carbon dioxide absorbent is a hydrophilic polymer. The recycling method includes removing a used carbon dioxide absorbent from the porous carrier by heating the direct air capture device to a predetermined temperature, and then causing a new carbon dioxide absorbent to be supported on the porous carrier.

10 Claims, 3 Drawing Sheets

(56) References Cited

FOREIGN PATENT DOCUMENTS

| | | | | | |
|---|---|---|---|---|---|
| WO | WO 2016/154278 | A1 | | 9/2016 | |
| WO | WO 2017/095765 | A1 | | 6/2017 | |
| WO | WO-2024133317 | A1 | * | 6/2024 | ............. B01D 53/02 |

OTHER PUBLICATIONS

Sanz-Pérez, E.S. et al., "Reuse and recycling of amine-functionalized silica materials for CO2 adsorption", Chemical Engineering Journal, Elsevier, Amsterdam, NL, vol. 308, Sep. 26, 2016, pp. 1021-1033.

* cited by examiner

| BEFORE $CO_2$ ABSORBENT IS SUPPORTED | AFTER $CO_2$ ABSORBENT IS SUPPORTED |
|---|---|

RECYCLING METHOD FOR DIRECT AIR CAPTURE DEVICE

CROSS-REFERENCE TO RELATED APPLICATION

This application claims priority to Japanese Patent Application No. 2023-068431 filed on Apr. 19, 2023, incorporated herein by reference in its entirety.

BACKGROUND

1. Technical Field

The disclosure relates to a recycling method for a direct air capture device.

2. Description of Related Art

To reduce carbon dioxide that is a greenhouse effect gas, there is known a direct air capture (DAC) device that directly captures carbon dioxide in air. In the direct air capture device, a carbon dioxide absorbent is supported on a porous carrier. As described in, for example, Japanese Unexamined Patent Application Publication No. 2012-055886 (JP 2012-055886 A), a carbon dioxide absorbent containing an amine is known as a carbon dioxide absorbent.

SUMMARY

In a direct air capture device, a carbon dioxide absorbent degrades as a result of use, so the direct air capture device, that is, the porous carrier on which the carbon dioxide absorbent is supported, is periodically replaced. In contrast, the inventors have been studying recycling of a direct air capture device by removing a used carbon dioxide absorbent from a porous carrier to reuse the porous carrier.

The disclosure provides a recycling method for a direct air capture device capable of reusing a porous carrier by removing a used carbon dioxide absorbent from the porous carrier.

An aspect of the disclosure provides a recycling method for a direct air capture device including a porous carrier on which a carbon dioxide absorbent is supported. The porous carrier is made of an inorganic material having a hydroxyl group. The carbon dioxide absorbent is made of a hydrophilic polymer. The recycling method includes removing a used carbon dioxide absorbent from the porous carrier by heating the direct air capture device to a predetermined temperature, and then causing a new carbon dioxide absorbent to be supported on the porous carrier.

According to the aspect of the disclosure, the porous carrier is made of an inorganic material having a hydroxyl group, the carbon dioxide absorbent is a hydrophilic polymer, and the recycling method includes removing a used carbon dioxide absorbent from the porous carrier by heating the direct air capture device to a predetermined temperature, and then causing a new carbon dioxide absorbent to be supported on the porous carrier. With this configuration, it is possible to reuse the porous carrier by removing a used carbon dioxide absorbent from the porous carrier.

The direct air capture device may further include a base having a honeycomb structure, and the porous carrier may be a coating film formed on the base. With this configuration, it is possible to reduce the amount of use of the porous carrier. The base may be made of ceramics.

The porous carrier may be a base having a honeycomb structure. With this configuration, no coating film of the porous carrier needs to be separately formed on the base.

The porous carrier may be made of a silica gel. The hydrophilic polymer may be an amine polymer. The predetermined temperature may be higher than or equal to 500° C.

The recycling method may further include removing a used carbon dioxide absorbent from the porous carrier and then holding the porous carrier in a vapor atmosphere before a new carbon dioxide absorbent is supported on the porous carrier. With this configuration, it is possible to recover a hydroxyl group lost from the porous carrier.

According to the aspect of the disclosure, it is possible to provide a recycling method for a direct air capture device capable of reusing a porous carrier by removing a used carbon dioxide absorbent from the porous carrier.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, a specific embodiment of the disclosure will be described in detail with reference to the accompanying drawings. However, the disclosure is not limited to the following embodiment. For clear illustration, the following description and drawings are simplified as needed.

First Embodiment

Configuration of Direct Air Capture Device

Figure 1:
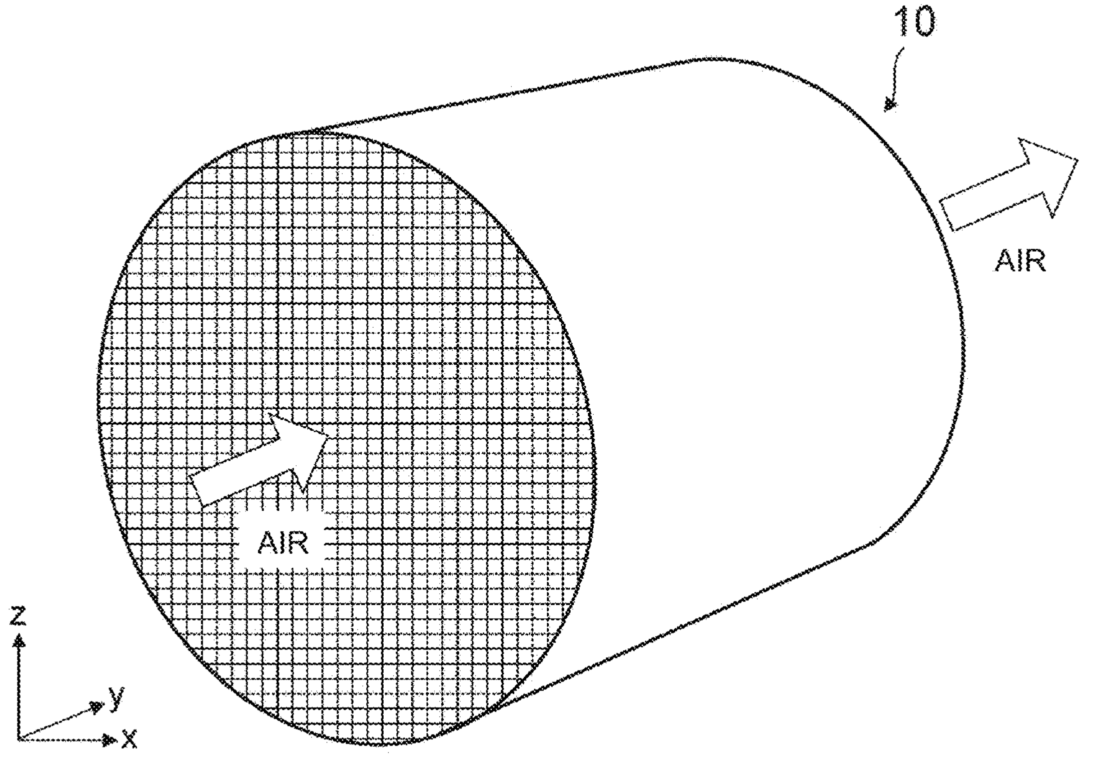
FIG. 1 is a perspective view of a direct air capture device according to a first embodiment.
Figure 2:
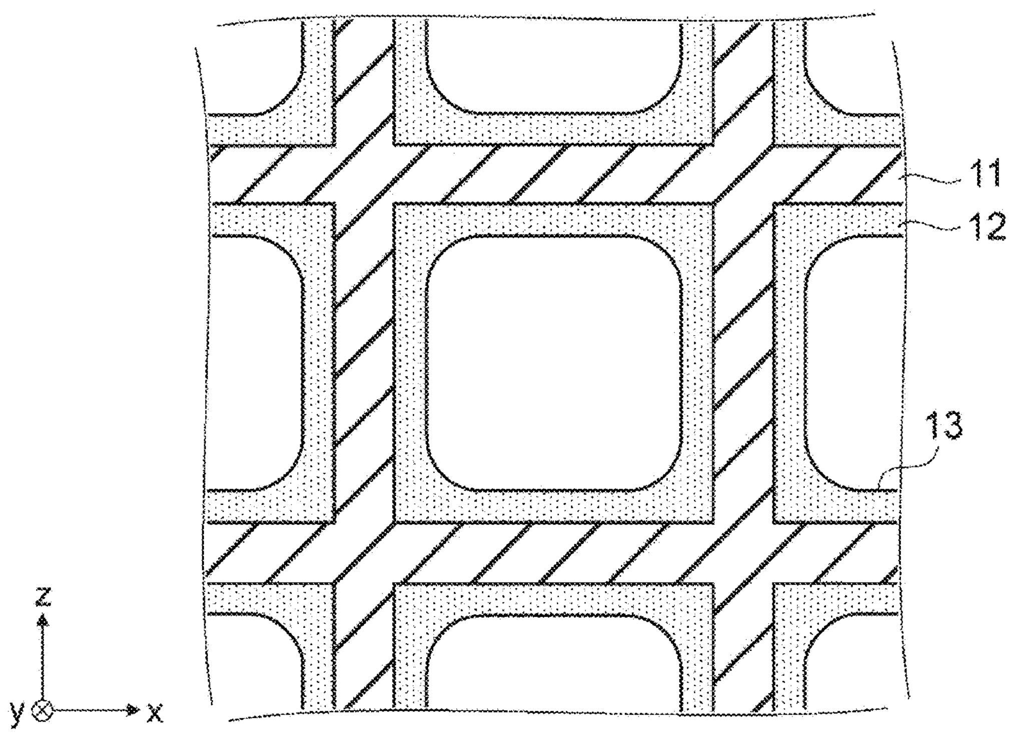
FIG. 2 is an enlarged cross-sectional view of the direct air capture device according to the first embodiment.

Initially, the configuration of a direct air capture device according to a first embodiment will be described with reference to FIG. 1 and FIG. 2. FIG. 1 is a perspective view of the direct air capture device according to the first embodiment. FIG. 2 is an enlarged cross-sectional view of the direct air capture device according to the first embodiment. Of course, right-handed x,y,z coordinates shown in the drawings are used for the sake of convenience to describe the positional relation among component elements. The x,y,z coordinates in each drawing are common, and a y-axis direction is an axial direction of a porous carrier 12.

As shown in FIG. 2, the direct air capture device 10 includes a base 11 and the porous carrier 12. As shown in FIG. 1, a carbon dioxide absorbent is supported on the porous carrier 12, and the direct air capture device 10 is a device that causes the porous carrier 12 to contact with air and captures carbon dioxide in the air by adsorbing the carbon dioxide to the carbon dioxide absorbent.

As shown in FIG. 1, the base 11 has, for example, a substantially circular columnar shape as an outer shape. As shown in FIG. 2, the base 11 has a honeycomb structure made up of a plurality of channels 13 extending in the y-axis direction. As shown in FIG. 2, the inner periphery of each channel 13 is coated with the porous carrier 12 on which a carbon dioxide absorbent is supported.

As indicated by the outline arrow in FIG. 1, air passes in the axial direction (y-axis direction) in each of the channels 13 coated with the porous carrier 12, and carbon dioxide in air is absorbed by the carbon dioxide absorbent supported on the porous carrier 12. In FIG. 2, the cross-sectional shape of each channel 13 is a square shape. Alternatively, the cross-sectional shape may be a hexagonal shape or the like. The outer shape of the base 11 is not limited and may be, for example, a prism shape or the like.

The base 11 is made of, for example, an inorganic material and, specifically, made of ceramics, such as cordierite and electrically conductive silicon carbide (SiC). The base 11 may be made of a metal.

The porous carrier 12 supports a carbon dioxide absorbent in micropores with, for example, a diameter of about 2 nm to about 100 nm. The porous carrier 12 is made of an inorganic material having a hydroxyl group and is, for example, a silica gel. Since the porous carrier 12 is porous, a surface area in which the supported carbon dioxide absorbent contacts with air increases, with the result that it is possible to adsorb carbon dioxide with high efficiency.

In the present embodiment, the porous carrier 12 is a coating film formed on the base 11. The porous carrier 12 may be formed by, for example, applying a kneaded material onto the base 11. The kneaded material is a mixture of powder of an inorganic material (for example, a silica gel) having a hydroxyl group with an inorganic binder, such as water glass. In the present embodiment, since the porous carrier 12 is a coating film, it is possible to reduce the amount of use of the porous carrier 12 as compared to a modification (described later).

The carbon dioxide absorbent is a hydrophilic polymer. Specifically, the carbon dioxide absorbent is, for example, an amine polymer, such as polyethyleneimine, primary amine, secondary amine, and secondary alkanolamine.

In capturing carbon dioxide, a process (see FIG. 1) of adsorbing carbon dioxide by passing air through the direct air capture device 10 at room temperature and a process (not shown) of desorbing carbon dioxide by heating the direct air capture device 10 to, for example, about 100° C. are repeatedly performed. When the adsorption process and the desorption process are repeated, the carbon dioxide absorbent degrades.

For this reason, in an existing direct air capture device, the direct air capture device, that is, the porous carrier on which the carbon dioxide absorbent is supported, is periodically replaced. In contrast, in the direct air capture device 10 according to the present embodiment, a used carbon dioxide absorbent is removed from the porous carrier 12, and the base 11 and the porous carrier 12 are reused. A recycling method for the direct air capture device 10 according to the present embodiment will be described later. In the desorption process, the base 11 may be heated by energization.

Modification

Figure 3:
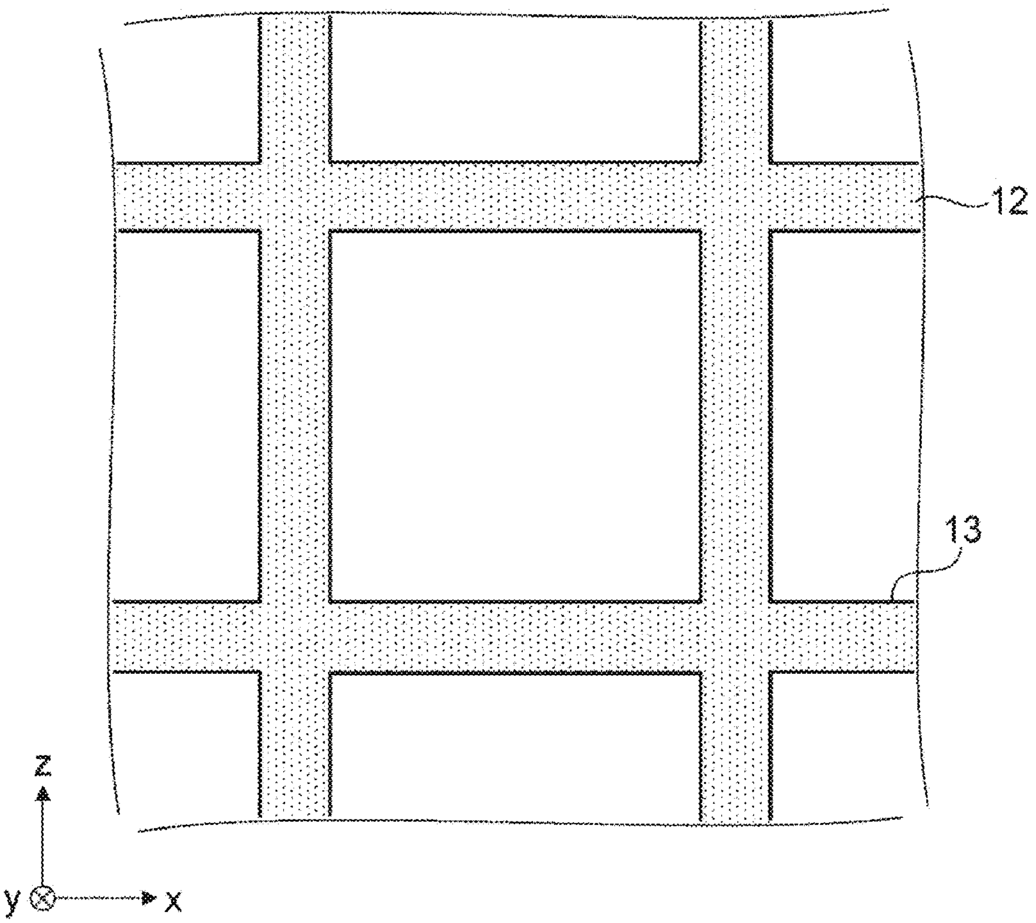
FIG. 3 is an enlarged cross-sectional view of a direct air capture device according to a modification of the first embodiment.

Here, the configuration of a direct air capture device according to a modification of the first embodiment will be described with reference to FIG. 3. FIG. 3 is an enlarged cross-sectional view of the direct air capture device according to the modification of the first embodiment. FIG. 3 corresponds to FIG. 2.

As shown in FIG. 3, in the direct air capture device 10 according to the modification, the porous carrier 12 is a base having a honeycomb structure. In other words, the porous carrier 12 may have a honeycomb structure made up of the channels 13 extending in the y-axis direction. In the direct air capture device 10 shown in FIG. 3, the porous carrier 12 is a base, so no coating film of a porous carrier needs to be separately formed on the base as compared to the direct air capture device 10 shown in FIG. 2.

A carbon dioxide absorbent is supported on the inner periphery of each channel 13 shown in FIG. 3. In the direct air capture device 10 according to the modification as well, the porous carrier 12 supports a carbon dioxide absorbent in micropores with, for example, a diameter of about 2 nm to about 100 nm. The porous carrier 12 is made of an inorganic material having a hydroxyl group and is, for example, a silica gel.

Recycling Method for Direct Air Capture Device

Next, a recycling method for the direct air capture device according to the present embodiment will be described. Initially, a used carbon dioxide absorbent is removed from the porous carrier 12 by heating the direct air capture device 10 shown in FIG. 1 and FIG. 2 to a predetermined temperature. A heating temperature for removing a used carbon dioxide absorbent is higher than a heating temperature in the desorption process and is, specifically, higher than or equal to, for example, 500° C. The heating may be performed by heating the base 11 through energization, as in the case of the desorption process.

The carbon dioxide absorbent made of a hydrophilic polymer dissolves as a result of heating for removing the carbon dioxide absorbent. Then, the hydroxyl group of the porous carrier 12 is lost. Therefore, the direct air capture device 10 of which the carbon dioxide absorbent is removed from the porous carrier 12 may be held in, for example, a vapor atmosphere, to recover a hydroxyl group lost from the porous carrier 12. Specifically, the direct air capture device 10 is held in a saturated vapor atmosphere at, for example, 80° C.

Subsequently, a new carbon dioxide absorbent is supported on the porous carrier 12 from which the used carbon dioxide absorbent is removed. In this way, only the carbon dioxide absorbent is replaced and the base 11 and the porous carrier 12 are reused, so it is possible to reduce carbon dioxide recovery cost.

As described above, with the recycling method for the direct air capture device 10 according to the present embodiment, a used carbon dioxide absorbent is removed from the porous carrier 12 by heating the direct air capture device 10 to a predetermined temperature, and then a new carbon dioxide absorbent is supported on the porous carrier 12. In other words, only the carbon dioxide absorbent is replaced and the base 11 and the porous carrier 12 are reused, so it is possible to reduce carbon dioxide recovery cost.

Hereinafter, the recycling method for the direct air capture device 10 according to the first embodiment will be described in detail by way of Example. However, the recycling method for the direct air capture device 10 according to the first embodiment is not limited to only the following Example.

Test Conditions

Branched polyethyleneimine with an average molecular weight of 600 (made by FUJIFILM WAKO) was used as a carbon dioxide absorbent. A 20 percent by mass polyethyleneimine solution was prepared by adding 24 g of ethanol to 6 g of polyethyleneimine. A bead silica gel (CARiACTQ-10 made by FUJI SILYSIA CHEMICAL, Ltd.) was put into the polyethyleneimine solution as a porous carrier, and stirred in a hermetically closed casing. After that, ethanol was removed in a reduced pressure, and then dried at 80° C. Here, a silica gel is an inorganic material having a hydroxyl group, and polyethyleneimine is a hydrophilic polymer.

Through the above process, polyethyleneimine that is a carbon dioxide absorbent was supported on the surface of the silica gel that is a porous carrier. The porous carrier corresponds to the porous carrier 12 in FIG. 2. The silica gel has mesopores with a mesopore distribution of 1.1 mL/g, and polyethyleneimine is supported in the mesopores.

Figure 4:
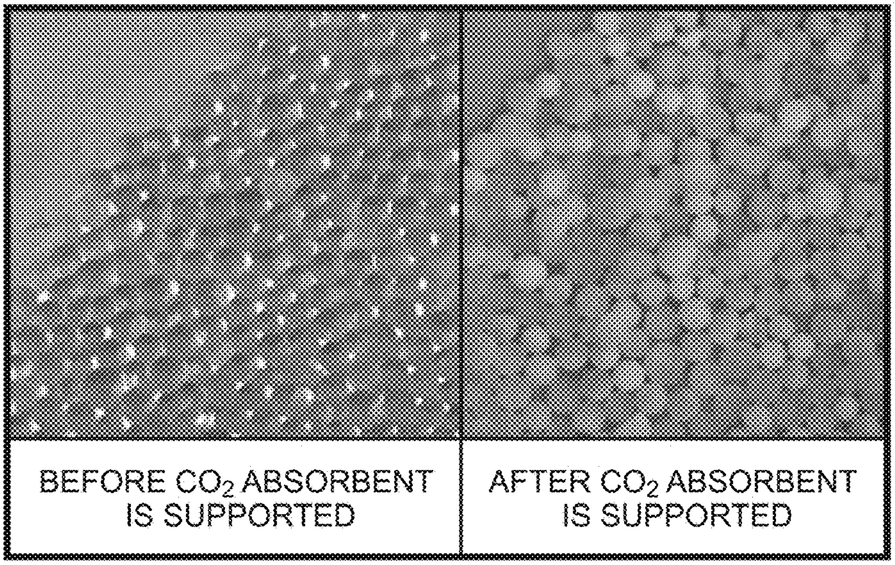
FIG. 4 shows macro photographs of a bead silica gel before and after polyethyleneimine is supported.

Here, FIG. 4 shows macro photograms of a bead silica gel before and after polyethyleneimine is supported. As shown in FIG. 4, before polyethyleneimine is supported, a silica gel is transparent, and, after polyethyleneimine is supported, the silica gel turns into white when polyethyleneimine is supported in the mesopores.

Subsequently, to remove polyethyleneimine supported on the silica gel, the silica gel on which polyethyleneimine was supported was heated to the predetermined temperature and held for six hours while air was being flowed at a rate of 2 L/minute. The heating temperature was changed, a situation in which polyethyleneimine serving as the carbon dioxide absorbent was removed was observed, and a pore distribution was measured. The heating temperature was set to 400° C., 450° C., and 500° C.

Test Results

Figure 5:
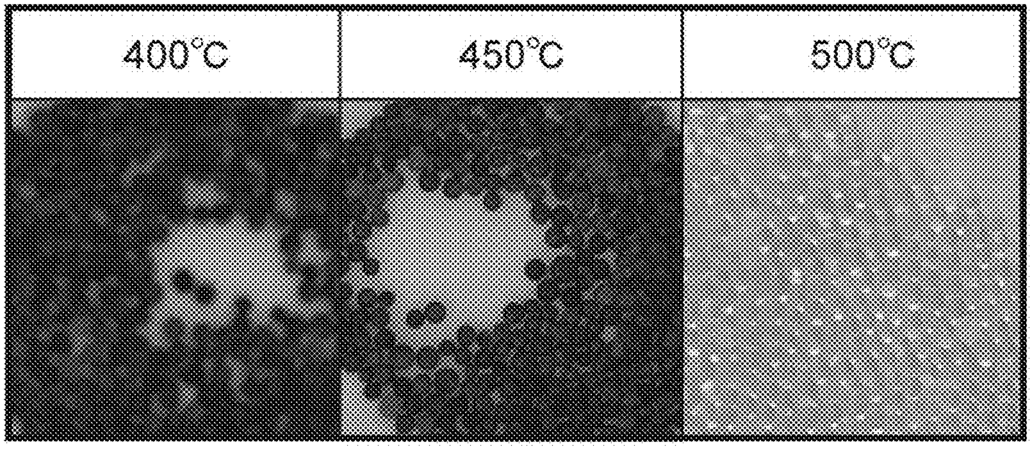
FIG. 5 shows macro photographs of a silica gel after being heated to temperatures to remove polyethyleneimine.

FIG. 5 shows macro photographs of a silica gel after being heated to temperatures to remove polyethyleneimine. When polyethyleneimine is heated to the predetermined temperature or higher, polyethyleneimine oxidizes to produce carbon dioxide or nitrogen dioxide, and polyethyleneimine disappears.

As shown in FIG. 5, at the heating temperature of 400° C. and at the heating temperature of 450° C., polyethyleneimine was partially not removed and left, and the silica gel turned into black. A pore distribution at the heating temperature of 400° C. was 0.91 mL/g, and a pore distribution at the heating temperature of 450° C. was 0.97 mL/g. As shown in FIG. 5, at the heating temperature of 500° C., polyethyleneimine was sufficiently removed, and the silica gel turned into transparent again. A pore distribution at the heating temperature 500° C. was 1.2 mL/g, and recovered to exceed 1.1 mL/g before use.

It is clear from the results of the above-described Example that, when a direct air capture device in which a carbon dioxide absorbent that is a hydrophilic polymer is supported on a porous carrier made of an inorganic material having a hydroxyl group is heated to 500° C. or higher, the carbon dioxide absorbent is sufficiently removed and the porous carrier can be reused.

The disclosure is not limited to the above-described embodiment and may be modified as needed without departing from the scope of the disclosure. The disclosure contributes to carbon neutral, decarbonization, and Sustainable Development Goals (SDGs).

What is claimed is:

1. A recycling method for a direct air capture device including a porous carrier on which a carbon dioxide absorbent is supported, wherein:

the porous carrier is made of an inorganic material having a hydroxyl group;

the carbon dioxide absorbent is a hydrophilic polymer; and the recycling method comprising removing a used carbon dioxide absorbent from the porous carrier by heating the direct air capture device to a predetermined temperature, wherein the predetermined temperature is higher than or equal to 500° C. and;

supporting a new carbon dioxide absorbent on the porous carrier, wherein a mesopore distribution of the porous carrier after heating to the predetermined temperature is recovered to a same or larger mesopore distribution as compared to that before heating to the predetermined temperature.

2. The recycling method according to claim 1, wherein:

the direct air capture device further includes a base having a honeycomb structure; and the porous carrier is a coating film formed on the base.

3. The recycling method according to claim 2, wherein the base is made of ceramics.

4. The recycling method according to claim 1, wherein the porous carrier is a base having a honeycomb structure.

5. The recycling method according to claim 1, wherein the porous carrier is a base having a silica gel.

6. The recycling method according to claim 1, wherein the hydrophilic polymer is an amine polymer.

7. The recycling method according to claim 1, further comprising removing a used carbon dioxide absorbent from the porous carrier and then holding the porous carrier in a vapor atmosphere before a new carbon dioxide absorbent is supported on the porous carrier.

8. The recycling method of claim 1, wherein the hydrophilic polymer has an average molecular weight of 600.

9. The recycling method of claim 5, wherein the silica gel has mesopores with a mesopore distribution of 1.1 mL/g, and the hydrophilic polymer is supported in the mesopores.

10. The recycling method of claim 9, wherein the hydrophilic polymer is polyethyleneimine.

* * * * *